Patented Aug. 11, 1931

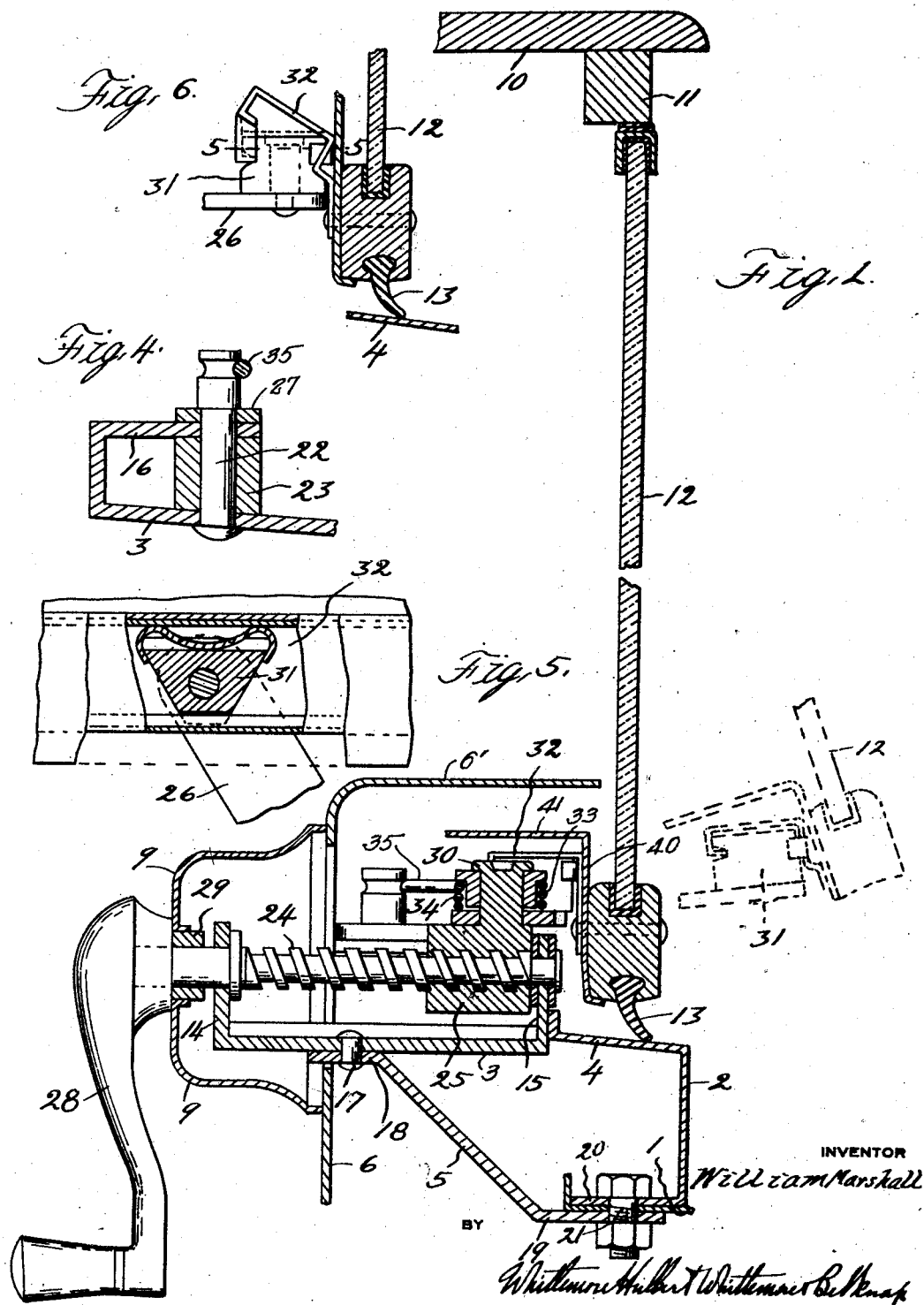

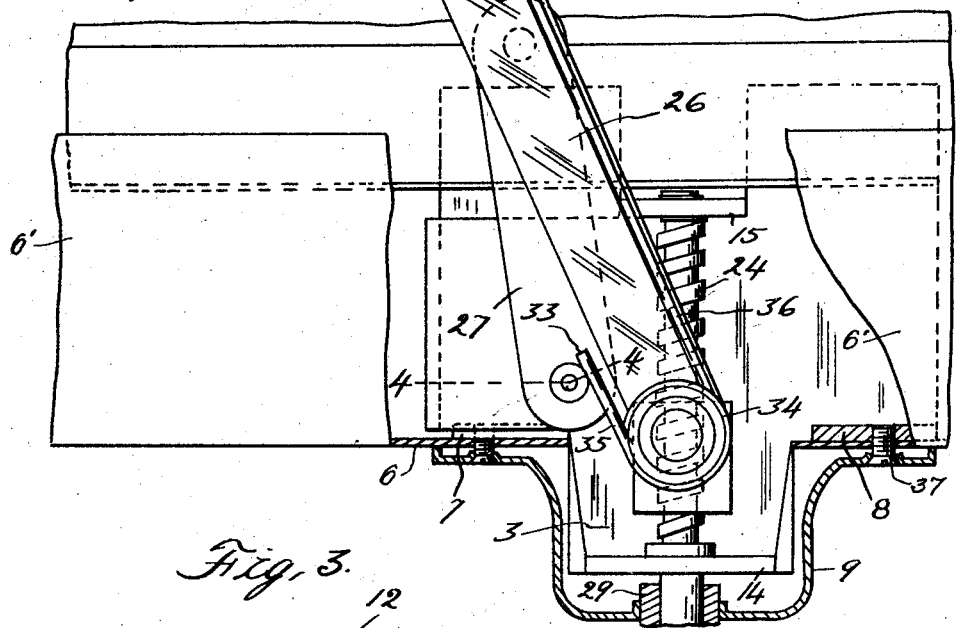
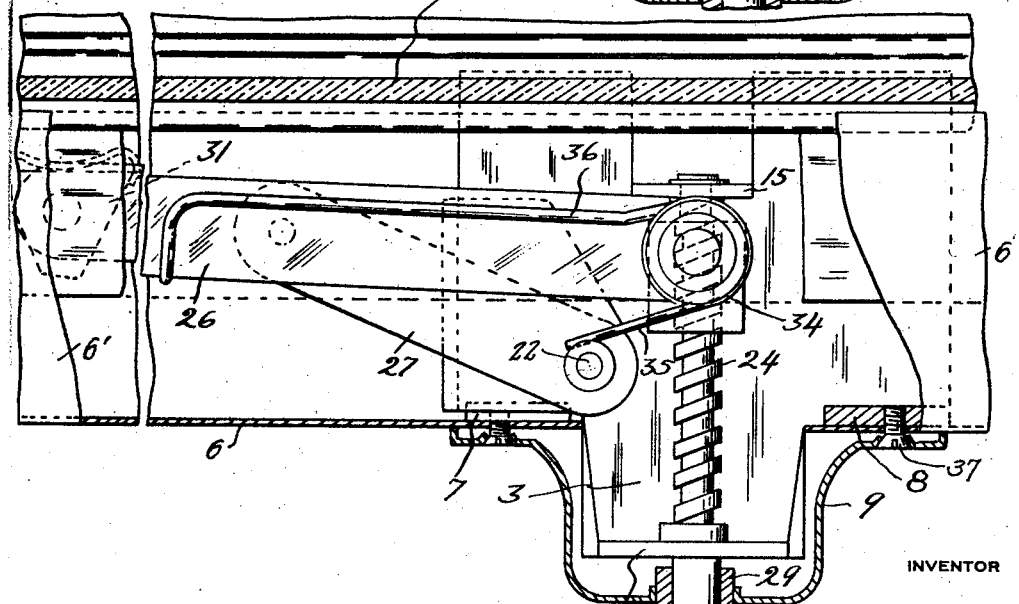

1,818,636

UNITED STATES PATENT OFFICE

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN

MEANS FOR SUPPORTING THE OPERATING MECHANISM FOR WINDSHIELDS

Original application filed June 20, 1927, Serial No. 200,090. Divided and this application filed April 1, 1929. Serial No. 351,780.

This invention relates generally to means for supporting the operating mechanism for windshields of motor vehicles, and consists of certain novel features of construction, combinations and arrangements of parts that will be hereinafter more fully described and particularly pointed out in the appended claims.

This application constitutes a divisional of an application filed jointly by Curtis W. Behnke and myself for windshield regulator mechanism, Serial Number 200,090, filed June 20, 1927.

In the accompanying drawings:

Figure 1 is a vertical sectional view through the windshield operating mechanism and portions of a vehicle body of the closed type;

Figure 2 is a fragmentary horizontal sectional view through the construction shown in Figure 1 and showing the windshield in open position;

Figure 3 is a view similar to Figure 1 showing the windshield in closed position;

Figure 4 is a detailed sectional view taken on the line 4—4 of Figure 2;

Figure 5 is a sectional view taken on the line 5—5 of Figure 6;

Figure 6 is a detailed sectional view through the bottom of the windshield.

Referring now to the drawings, wherein I have illustrated a portion of the vehicle body of the closed type, 1 is a cowl, 2 is a channel shaped belt rail arranged at one side upon and secured to the cowl at the rear end thereof, 3 is a bracket received in the channel of the belt rail and rigidly secured to the upper wall 4 thereof, 5 is a substantially Z-shaped brace for the bracket, 6 is an instrument board or channel secured to the upstanding flanges 7 and 8 of the bracket and provided at its upper end with forwardly extending portions 6' that extend over the bracket 3 and a portion of the belt rail, and 9 is an escutcheon on the instrument board and secured to the bracket flanges 7 and 8. 10 is the top of the vehicle, 11 is the windshield header and 12 is a windshield hingedly connected at its upper edge to the header 11 and provided at its lower edges with a weatherstrip 13 that normally engages the belt rail 2.

As shown, the body portion of the bracket 3 is flat, is provided with longitudinally spaced upstanding flanges 14 and 15, has an open return-bent flange 16 at one side, and rests upon and is rigidly secured, preferably by rivets 17, to the rear portion 18 of the brace. The forward portion 19 of this brace is secured to the lower wall 20 of the belt bar, preferably by the bolts 21 that connect the belt bar 2 and cowl 1. 22 is a stud extending through the bracket 3 and return-bent flange 16, and 23 is a tube sleeved upon the stud 22 between the bracket 3 and flange 16 and constituting a spacer for the flange 16.

For operating the windshield 12, I have provided a screw 24 journalled in the upstanding flanges 14 and 15 of the bracket, a block 25 threaded upon and movable longitudinally of the screw 24, an arm 26 terminally connected to said block and windshield, a brace or link 27 terminally connected to said arm 26 and stud 22, and a crank 28 having a hub 29 journalled in the escutcheon 9 and rigidly secured to the screw 24 at the rear end thereof. Preferably, the arm 26 is pivoted upon the upstanding portion 30 of the block and carries a roller 31 that travels in a channel 32 of the windshield, while the link 27 is pivoted to the arm 26 and rests upon the return-bent flange 16. A spring 33, having a coiled portion 34 sleeved upon the upstanding portion 30 of the block and having diverging arms 35 and 36 engaging the stud 22 and arm 26, urges the latter and the windshield forwardly and outwardly with respect to the belt rail.

For controlling the direction of the air entering the vehicle body a deflector 40 is secured to the windshield 12 at the lower edge thereof and is provided with an inwardly extending flange 41 that cooperates with the lateral extensions 6' of the instrument board 6 to form an air duct. With the foregoing arrangement, when the windshield is closed no ventilation is possible as the air is absolutely excluded by the weatherstrip 13. However, during the initial steps of adjustment of the windshield, i. e., during any of the positions of adjustment between the positions shown in full and dotted lines in Figure 1, air admitted between the lower edge of the windshield and the part 4 of the belt bar will be directed by the deflector flange 41, instrument board extensions 6' and instrument board 6 downwardly between the said instrument board and cowl. In this connection it will be noted that the rear edge of the flange 41 of the deflector lies adjacent the forward edge of the instrument board extensions 6' so that air as well as other elements will be intercepted from passing upwardly and against the occupants of the vehicle when the windshield is in partially opened position. As long as the deflector is in close proximity to the extensions 6' the ventilation will be limited to the air passing under the flange 41 and portions 6' of the instrument board and through the passage formed by the latter of the cowl. However, when the windshield is swung to a position in which the deflector is spaced a considerable distance from the portions 6' of the instrument board, air will also pass over the extensions 6' into the vehicle. When in this position air will also continue to flow downwardly as previously described between the instrument board and cowl.

Thus from the foregoing description, it will be apparent that I have provided a strong and durable assembly in which the operating means for the windshield is conveniently mounted at the belt bar of the vehicle body. The bolts 21 serve as a common securing means for the cowl, belt bar and brace, and the screws 37 constitute a common securing means for the escutcheon, instrument board and bracket. Moreover the bracket constitutes a common supporting means for the screw 24 and stud 22 and associated parts. Hence a very compact and sturdy construction has been provided and may be easily and quickly installed in the vehicle body of various types and styles.

While an illustrative embodiment of this invention has been shown and described somewhat in detail, it will be immediately apparent to those skilled in this art that various modifications in which details of construction as well as rearrangements of the parts may be resorted to, as found necessary or desired without departing from the spirit and scope of this invention and to this end reservation is made to make such changes as may come within the purview of the accompanying claims.

What I claim as my invention is:

1. In a means of the class described, the combination with a belt bar, of a bracket carried thereby having a plurality of flanges, certain of said flanges constituting bearings for a windshield actuating member, and an escutcheon plate secured to another flange of the plurality aforesaid and having means for receiving a portion of an operating member for the actuating member aforesaid.

2. In a means of the class described, the combination with a belt rail, an instrument panel, a windshield operating member, and an escutcheon for said member, of a bracket secured to the belt rail, extending between portions of the panel, having a portion enveloped by a portion of the escutcheon, having means for supporting the operating member, and having other portions to which the instrument panel and escutcheon are secured.

3. In a means of the class described, the combination with a belt rail, of a bracket secured to said rail having substantially vertical flanges constituting supporting bearings for a windshield operating member, having substantially vertical flanges to which an instrument panel and escutcheon are attachable, and having another flange for supporting a brace for the operating member.

4. In a means of the class described, the combination with a belt rail, of a bracket secured to the rail at the top thereof, having means for supporting a windshield operating member and having flanges upon opposite sides of said means, an instrument board straddling the bracket and secured to the flanges, and an escutcheon for the operating member enveloping a portion of the bracket and secured to said flanges.

5. In a means of the class described, the combination with a belt rail, of a bracket secured to said rail, having portions for supporting a windshield operating member, having other portions to which an instrument panel and an escutcheon are attachable, and having another portion for supporting a brace for the operating member aforesaid.

In testimony whereof I affix my signature.

WILLIAM MARSHALL.